United States Patent [19]
Cooper

[11] Patent Number: 5,751,006
[45] Date of Patent: May 12, 1998

[54] WATER HEATED PANELS FOR SIMULATING THE INFRARED SIGNATURE OF A TARGET

[75] Inventor: Guy F. Cooper, Ventura, Calif.

[73] Assignee: The United States of America as represented by the Secretary of the Navy, Washington, D.C.

[21] Appl. No.: 851,390

[22] Filed: May 5, 1997

[51] Int. Cl.$^6$ .................................................. H05B 3/26
[52] U.S. Cl. ..................... 250/495.1; 250/493.1; 250/504 R; 219/553
[58] Field of Search .................. 250/495.1, 493.1, 250/504 R; 219/552, 553

[56] References Cited

U.S. PATENT DOCUMENTS

| | | | |
|---|---|---|---|
| 4,922,116 | 5/1990 | Grinberg et al. | 250/495.1 |
| 5,065,032 | 11/1991 | Prosser | 250/495.1 |
| 5,296,270 | 3/1994 | Prosser | 427/448 |

*Primary Examiner*—Kiet T. Nguyen
*Attorney, Agent, or Firm*—Melvin J. Sliwka; David S. Kalmbaugh

[57] ABSTRACT

A array of water heated panel comprising a rectangular shaped support structure having a fluid inlet passageway positioned at the top portion of the structure and a fluid outlet passageway positioned at the bottom portion of the structure. The support structure also has a plurality of equally spaced substantially parallel fluid transport tubes which run the length of support structure. Each fluid transport tube within the support structure has one end connected to the inlet passageway and an opposite end connected to the outlet passageway. The support structure also has a flat outer radiating surface which is positioned adjacent to the fluid transport tube of the water heated panel. The fluid transport tubes of the water heated panel efficiently transfers heat from heated water flowing through the fluid transport tubes to the radiating surface of the water heated panel without substantial heat loss. The heat transfer to the radiating surface simulates the thermal surface features and infrared signature of the heat generating structure or device on a target vessel. A computer controls the thermal profile of the panels which allows for a simulation of any required infrared signature.

17 Claims, 4 Drawing Sheets

WATER HEATED PANELS FOR SIMULATING THE INFRARED SIGNATURE OF A TARGET

BACKGROUND OF THE INVENTION

1. Field of the Invention

The present invention relates generally to an apparatus for simulating the infrared signatures of a target. In particular, the present invention relates to water heated panels which are mounted on an ocean going target vessel to simulate the thermal surface features and infrared signatures emitted from the target vessel to a guided missile or the like tracking the target vessel.

2. Description of the Prior Art

Military personnel can use infrared sensors to detect equipment and personnel on board a target, such as an ocean going vessel or ship that would otherwise be invisible either because of camouflaging or due to an insufficiency of visible light. The infrared sensors are able to profile the thermal topography of a region through amplification and analysis of the light emitting in the infrared region of the light spectrum. Temperature deviations of less than ½ degree Fahrenheit above the ambient temperature, can be discerned. The infrared technology is often incorporated by the military into an array of weapon systems to spot, track and align guidance systems and sights of a weapon onto a radiant heat source, such as equipment or personnel on board an ocean going vessel. Thermal imaging using infrared detectors is accurate enough to identify not only the position of the radiant heat source, but also details specific enough to distinguish signature morphological features. To practice identifying and shooting potential targets the military uses training aids that simulate real life equipment and personnel. The training aids can be two or three dimensional, full or scaler reproductions of the simulated objects. To simulate the heat actually generated by the equipment or personnel, the training aids or targets must themselves give off a comparable amount of energy. A method to affect this thermal image is to use targets that are covered with a type of electric blanket, where the blanket is heated and shaped so as to imitate the heated and more distinguishing thermal surface features of the simulated object. The military may also use heating elements such as commercially available heaters and the like to simulate the thermal surface features and infrared signatures of a target.

Thermal targets may be erected on a firing range, which may be in a land or ocean environment, for gunnery practice at some future date. On the range a number of practical problems have been encountered that require inexpensive solutions. Thermal targets simulating large pieces of equipment tend themselves to be both expensive and massive, requiring several people and multiple pieces to assemble. For example, thermal targets using an electrical system to produce a thermal image are frequently sensitive to climatic conditions, and are on the whole not sufficiently dependable.

Infrared emitting targets must meet a number of criteria to optimize their utility, and the instant invention is amenable to creating thermal images on widely differing target sizes, shapes and performance characteristics. The surface of the target must emit a quantity of heat that imitates real life equipment and personnel. A temperature of 15–50 degrees Fahrenheit above ambient is usually sought. The surface must attain this temperature in a matter of seconds after the target is activated. The size, shape and distribution of the irradiating thermal image must mimic the real life counterpart. The cost of construction of the total target must be relatively inexpensive, as destruction is the ultimate goal. The target must have good weatherability as it will be used outdoors and may be used in a seawater environment. In addition, it is very important that the target be capable of withstanding several hits and still maintain its thermal image to the extent that its thermal features or signature are still intact and discernible. The target should also be fire resistant. The target should also be safe to operate with respect to the auxiliary equipment (generators and batteries) as well as with supporting personnel.

In view of the foregoing, what is needed is a relatively simple, yet highly effective and simple to fabricate apparatus for simulating the thermal surface features and infrared signatures emitted from a target vessel or the like to a guided missile for testing the infrared tracking capability of the missile.

SUMMARY OF THE INVENTION

The present invention overcomes some of the disadvantages of the prior art including those mentioned above in that it comprises a relatively simple yet highly reliable and efficient water heated panel which is mounted on an ocean going target vessel to simulate the thermal surface features and infrared signature of a heat generating structure or device on a target vessel. The simulated infrared signature which is emitted from the target vessel is used by a guided missile or the like to track the target vessel.

The water heated panel comprises a rectangular shaped support structure having a fluid inlet passageway positioned at the top portion of the structure and a fluid outlet passageway positioned at the bottom portion of the structure. The support structure also has a plurality of equally spaced substantially parallel fluid transport tubes which run the length of support structure. Each fluid transport tube within the support structure has one end connected to the inlet passageway and an opposite end connected to the outlet passageway.

The support structure also has a flat outer radiating surface which is positioned adjacent to the fluid transport tube of the water heated panel. The fluid transport tubes of the water heated panel efficiently transfers heat from heated water flowing through the fluid transport tubes to the radiating surface of the water heated panel without substantial heat loss. The heat transfer to the radiating surface simulates the thermal surface features and infrared signature of the heat generating structure or device on the target vessel.

Heated water at a predetermined temperature above ambient (e.g. 15–50 degrees above ambient) is supplied to the water heated panel by a computer controlled fluid flow which monitors the temperature of the water flowing through the water heated panel and maintains the water temperature at the predetermined temperature. The temperature of the water flowing through the panel is determined by the heat generating structure or device on the target vessel the water heated panel is simulating.

DETAILED DESCRIPTION OF THE PREFERRED EMBODIMENTS

Figure 1:
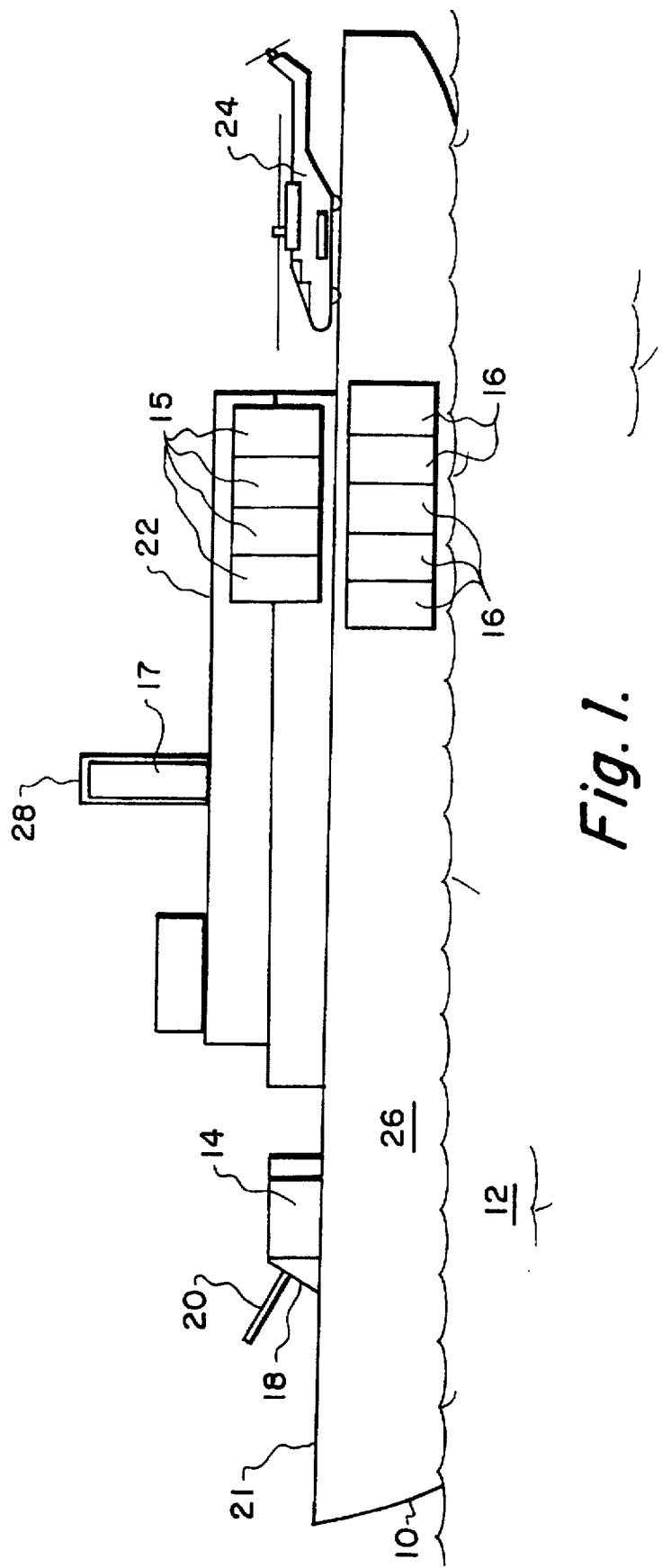
FIG. 1 illustrates an ocean going target vessel having the water heated panels of the present invention mounted thereon to simulate the thermal surface features and infrared signatures emitted from the target vessel.
Figure 2:
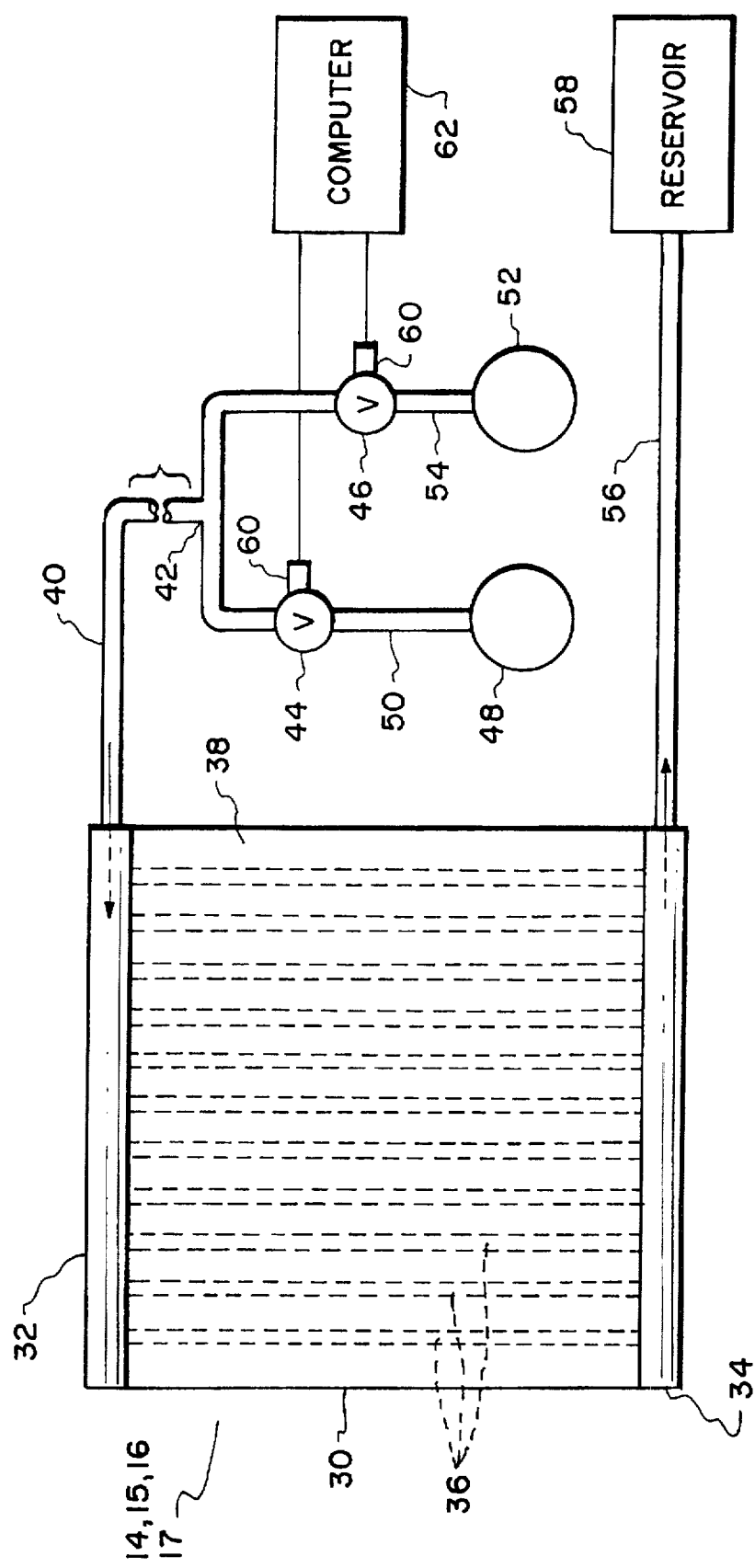
FIG. 2 is a simplified schematic diagram of a preferred embodiment of one of the water heated panels mounted on the ocean going target vessel of FIG. 1.

Referring first to FIGS. 1 and 2 there is shown a target vessel 10 which may be used in a seawater environment 12 to test the infrared tracking system of a guided missile or the like (not illustrated).

Target vessel 10 has mounted thereon a plurality of water heated panels 14, 15, 16 and 17 which are adapted to simulate the thermal surface features and infrared signatures emitted from target vessel 10 to the guided missile tracking the infrared signatures of target vessel 10.

Specifically, water heated panel 14 is mounted on gun turret 18 which is located on the forward end of deck 21 of target vessel 10. The water heated panel 14 is used to simulate the thermal surface features and infrared signatures emitted from the gun turret 18 when rounds are fired by the gun 20 mounted on gun turret 18.

Similarly, four water heated panels 16 are mounted on a hanger 22 for helicopter 24 which is located toward the forward end of deck 21 of target vessel 10. The four water heated panels 16 are used to simulate the thermal surface features and infrared signatures emitted from hanger 22 when helicopter 24 is stored within hanger 22 shortly after a simulated landing of helicopter 24 on deck 21 of vessel 10.

There is mounted on the hull 26 of vessel 10 toward its rear, five water heated panels 16 which are adapted to simulate the thermal surface features and infrared signatures of the portion of the hull 26 which has the engines, boilers and other components of the vessel's power and heating systems.

There are also other areas of the target vessel 10 where water heated panels may be mounted on target vessel 10 such as panel 17 which is mounted on the smoke stack 28 of target vessel 10.

As depicted in FIG. 2 each water heated panel 14, 15, 16 and 17 mounted on target vessel 10 comprises a generally rectangular shaped support structure 30 having a fluid inlet passageway 32 positioned at the top portion of structure 30 and a fluid outlet passageway 34 positioned at the bottom portion of structure 30. Support structure 30 has a plurality of equally spaced substantially parallel fluid transport tubes 36 positioned therein which run the length of support structure 30. Each fluid transport tube 36 within support structure 30 has one end connected to inlet passageway 32 and an opposite end connected to outlet passageway 34.

Support structure 30 also has a flat outer radiating surface 38 which is positioned adjacent the fluid transport tube 36 of the water heated panel. The radiating surface 38 and fluid transport tubes 36 of each water heated panel 14, 15, 16 and 17 are fabricated from a material, such as copper, which effectively and efficiently transfers heat from heated water flowing through tubes 36 to radiating surface 38 without substantial heat loss.

A primary inlet pipe 40 which has an inverted T pipe structure 42 at one end connects inlet passageway 32 to the outlet ports of a pair of electrically activated fluid control valves 44 and 46. The inlet port of control valve 44 is connected to a cold water source 48 by a secondary inlet pipe 50 with source 48 providing water at ambient temperature. The inlet port of control valve 46 is connected to a heated water source 52 by a secondary inlet pipe 54 with source 52 providing water at temperatures of up to 50 degrees Fahrenheit above ambient.

A primary outlet pipe 56 connects outlet passageway 34 to a reservoir 58 which stores heated or cool water from the each of the water heated panels 14, 15, 16 and 17 mounted on target vessel 10.

The electrical control mechanism 60 for control valve 44 and control valve 46 is connected to a digital computer which controls the opening and closing of valves 44 and 46. For example, when computer 62 sends an electrical signal to control mechanism 60 of valve 46, valve 60 opens. In a like manner, when computer 62 sends an electrical signal to control mechanism 60 of valve 44, valve 44 opens. By controlling the opening and closing of valves 44 and 46, computer 62 regulates the temperature of water flowing through fluid transport tubes 36 of structure 30. This, in turn regulates the thermal surface features and the infrared signature emitted by radiating surface 38 of structure 30 to within the desired temperature range of 15–50 degrees Fahrenheit above ambient.

In operation, heated water from primary inlet pipe 40 enters the inlet passageway 32 of support structure 30. The heated water next passes through each of the fluid transport tubes 36 which results in heat transfer from transport tubes 36 to the radiating surface 38 of structure 30. Radiating surface 38 then emits heat transferred thereto simulating the infrared signature of the heated-area on target vessel 10 to which the particular panel 14, 15, 16 or 17 is attached. Water passing from tubes 36 exits structure 30 via outlet passageway 34 and then passes through outlet pipe 56 to reservoir 58.

Figure 3:
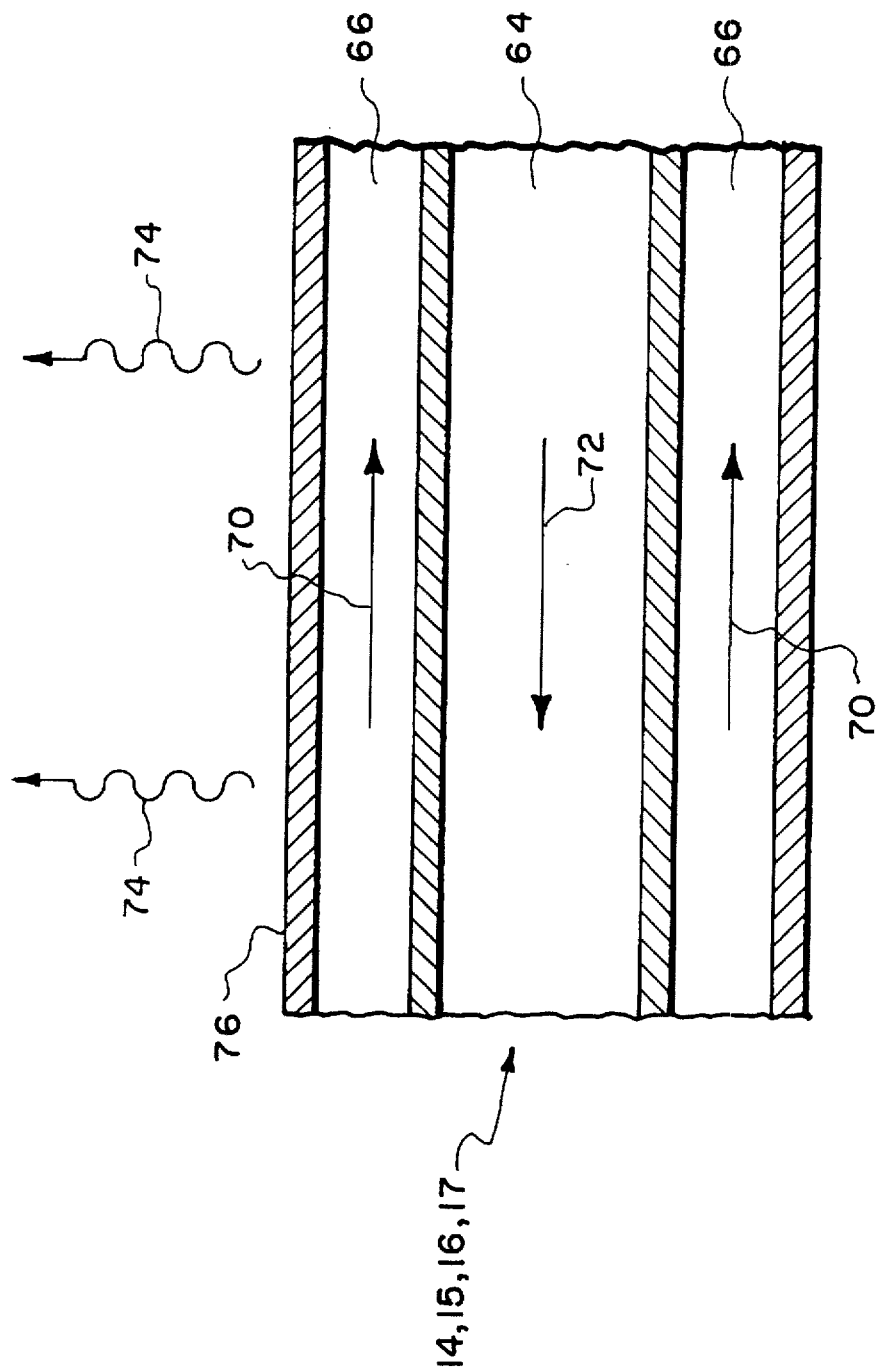
FIG. 3 is an alternate embodiment of one of the water heated panels mounted on the ocean going target vessel of FIG. 1.

Referring now to FIG. 3, there is shown an embodiment of the panels 14, 15, 16 and 17 mounted on target vessel 10 in which the infrared signature 74 is non-radiating. Each heated water fluid transport tube 64 of the panel illustrated in FIG. 3 is located within a cold water jacket (which in section is designated by the reference numeral 66) surrounding heated water fluid transport tube 64. When cold water or water at ambient temperature is flowing through jacket 66 with the direction of flow being indicated by arrows 70, jacket 66 functions as an infrared radiating shield to obscure heated water flowing through tube 64. As a result of the shield provided by the jacket 66 infrared radiation is not emitted from outer surface 76 thereby providing a substantially pure infrared signature 74 of the target vessel 10.

Figure 4:
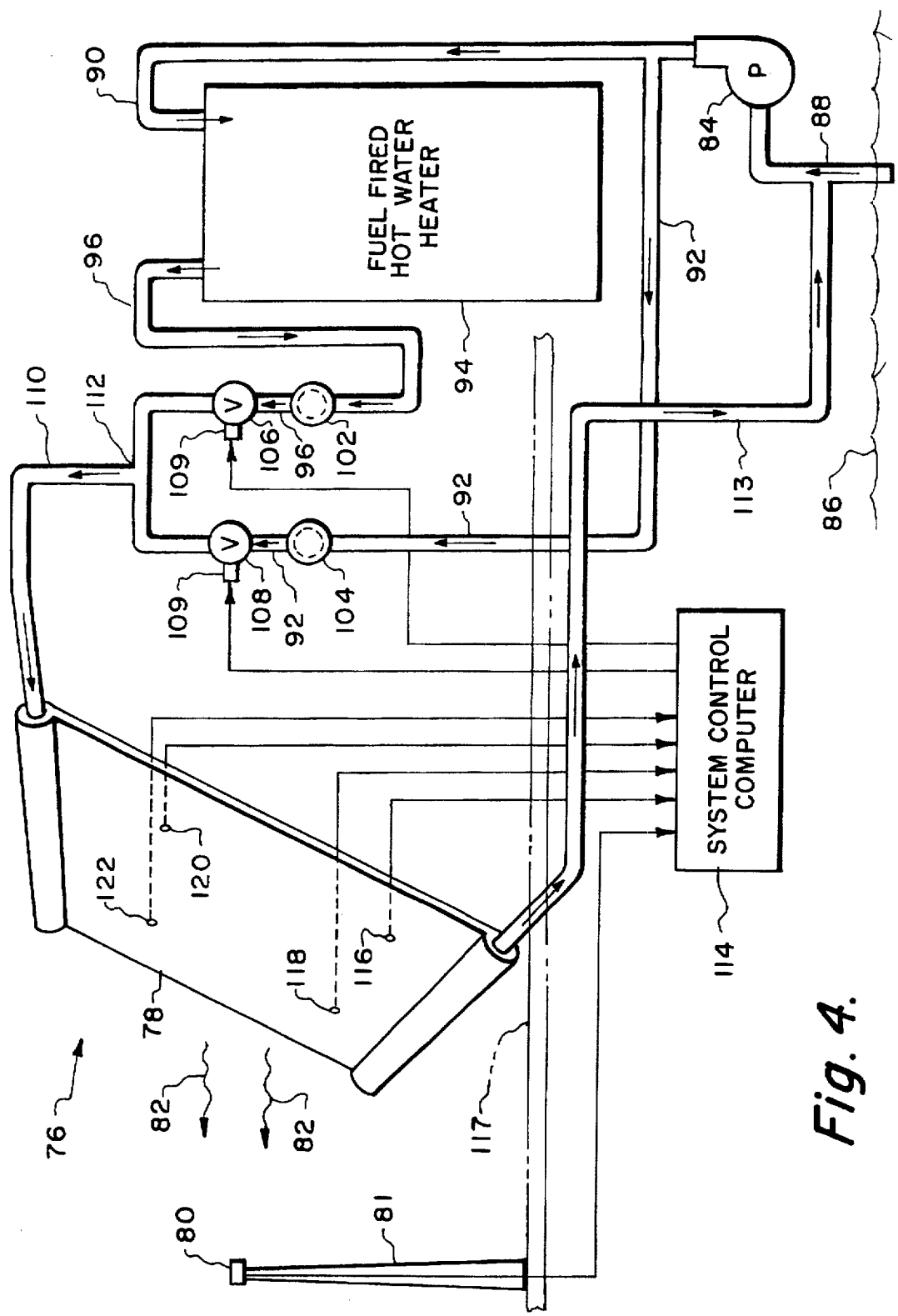
FIG. 4 is a schematic diagram of a single water heated panel of the type depicted in FIG. 2 which has computer control and a feed-back loop.

Referring now to FIGS. 1, 2 and 4, there is shown a computer controlled fluid flow system, designated generally by the reference numeral 76, for providing heated water to the water heated panel 78, which is identical to the panel illustrated in FIG. 2 and the panels 14, 15, 16 and 17 mounted on target vessel 10. System 76 also supplies heated water to the remaining panels 14, 15, 16 and 17 mounted on target vessel 10 when use with multiple panels mounted on a target.

System 76 includes a seawater pump 84 which draws seawater at ambient temperature from a reservoir such as the ocean 86 through a seawater inlet pipe 88 to pump 84. The ambient temperature range for seawater is normally between 68 degrees Fahrenheit and 77 degrees Fahrenheit.

The discharge port of pump 88 has one end of a cold water inlet pipe 90 and a cold water inlet pipe 92 connected thereto. The opposite end of inlet pipe 90 is connected to the inlet port of a hot water heater 94. Water heater 94 is adapted to heat seawater entering water heater 94 to temperatures of up to 50 degrees Fahrenheit above ambient.

The outlet port of water heater 94 is connected by a hot water inlet pipe 96 to an electrically activated fluid control valve 106. Cold water inlet pipe 92 is also connected to an electrically activated fluid control valve 108. Electrical control mechanisms 109 for control valve 106 and control valve 108 are connected to a digital computer 114 which controls the opening and closing of valves 106 and 108. Electrical control mechanism 109 may be, for example, a solenoid which is electrically actuated.

At this time it should be noted that hot water inlet pipe 96 has an auxiliary hot water pipe 102 connected thereto which provides heated water from hot water heater 94 to the remaining water heated panels and their associated control valves mounted on target vessel 10. Cold water inlet pipe 92 also has an auxiliary cold water pipe 104 connected thereto which provides seawater at ambient temperature to the remaining water heated panels and their associated control valves mounted on target vessel 10.

A primary inlet pipe 110 which has an inverted T pipe structure 112 at one end connects the inlet port of water heated panel 78 to the outlet ports of electrically activated fluid control valves 106 and 108. The outlet port of water heated panel 78 is connected to one end of a seawater return pipe 113, while the other end of seawater return pipe 113 is connected to seawater inlet pipe 88. Heated water from primary inlet pipe 110 flows through panel 78 heating panel 78 so that panel 78 will simulate the thermal surface features and infrared signature of a particular heat generating device (e.g. gun turret 14) or structure (e.g. hanger 22) of target vessel 10. The heated water then exits the outlet port of panel 78 flowing into seawater return pipe 113.

An optical pyrometer 80, which is supported by support stand 81 mounted on the deck 117 of target vessel 10, may be used to monitor water heated panel 78. Optical pyrometer 80 measures the infrared radiation 82 emitted by panel 78 and thus the thermal surface features and infrared signature of the heat generating device or structure on target vessel 10 panel 78 is simulating. Optical pyrometer 80 is connected to computer 114 providing an electrical signal to computer 114 indicative of the infrared signature 82 sensed by optical pyrometer 80. Computer 114, responsive to the electrical signal from pyrometer 80, will adjust the temperature of seawater flowing into panel 78 from primary inlet pipe 110 by closing and opening valves 106 and 108 to obtain the correct temperature for the particular heat generating device or structure of target vessel 10 panel 78 is simulating.

For example, if optical pyrometer 80 is measuring the infrared signature emitted by panel 14 which is simulating gun turret 17 and the required temperature for an accurate simulation of gun turret 17 is about 50 degrees above ambient, computer 114 will supply an electrical signal to electrical control mechanism 109 for control valve 106 to insure that valve 106 is open and will remain open so that heated water from hot water heater 94 will flow through valve 106 and primary inlet pipe 110 to the inlet port of water heated panel 78. The heated water next flows through panel 78 causing the radiating surface of panel 78 to generate infrared radiation 82 and thus a thermal signature which represents the gun turret 17 on target vessel 10. Simultaneously, computer 114 will generate an electrical signal which it supplies to the electrical control mechanism 109 for control valve 108 to insure that valve 108 closes and will remain closed so that the temperature of the water flowing through pipe 110 and then panel 78 will remain at approximately 50 degrees above ambient.

Mounted on the backside of water heated panel 78 are four thermocouples 116, 118, 120 and 122, one thermocouple of which is located near each corner of panel 78.

Each thermocouple 116, 118, 120 and 122 provides an electrical signal indicative of the temperature sensed by the thermocouple 116, 118, 120 or 122 to computer 114. Computer 114, responsive to the electrical signals provided by theremocouples 116, 118, 120 and 122 and the electrical signal provided by optical pyrometer 80, controls the opening and closing of electrically activated fluid control valves 106 and 108 to insure (1) a required average temperature across the radiating surface of panel 78 and (2) the thermal surface features and infrared signature for the particular heat generating device or structure (e.g. gun turret 18 simulated by panel 14) on target vessel 10 the panel is simulating.

When, for example the hanger 22 for helicopter 24 is being simulated by five panels 15 (FIG. 1) identical to panel 78, the required temperature may be 30 degrees above ambient. To obtain the required temperature computer 114 activates the electrical control mechanism 109 for control valve 106 and control valve 108 opening control valves 106 and 108. Opening control valves 106 and 108 allows heated water from hot water heater 94 to mix with cold water from cold water inlet pipe 92 until the required temperature of 30 degrees above ambient is reached to simulate the smoke stack 28 of target vessel 10. Equilibrium temperature is reached in approximately 5-10 minutes in response to a programmed target infrared signature stored within computer 114.

The electrical signals received from thermocouples 116, 118, 120 and 122 along with the electrical signal from optical pyrometer 80 are processed by computer 114 to indicate to computer 114 the temperature of water flowing through panel 78. Computer 114, responsive to these signals, maintains the temperature of heated water flowing through panel 78 at the required temperature of 30 degrees above ambient by selectively opening and closing valves 106 and 108. When the temperature of seawater flowing through panel 78 drops below the required temperature, computer 114 sends a signal to the electrical control mechanism 109 for control valve 108 closing valve 108 until the temperature rises to the required temperature of 30 degrees above ambient. In a like manner, when the temperature of seawater flowing through panel 78 rises above the required temperature, computer 114 sends a signal to the electrical control mechanism 109 for control valve 106 closing valve 106 until the temperature drops to the required temperature of 30 degrees above ambient.

From the foregoing, it may readily be seen that the present invention comprises a new, unique and exceedingly useful water heated panel array for simulating the thermal surface features and infrared signature of a target which constitutes a considerable improvement over the known prior art. Obviously many modifications and variations of the present invention are possible in light of the above teachings. It is therefore to be understood that within the scope of the appended claims that the invention may be practiced otherwise than as specifically described.

What is claimed is:

1. A water heated panel for simulating an infrared signature of a heat generating structure on a target vessel, said water heated panel comprising:

a generally rectangular shaped support structure;

a fluid inlet passageway positioned at a top portion of said rectangular shaped support structure;

a fluid outlet passageway positioned at a bottom portion of said rectangular shaped support structure;

a plurality of equally spaced substantially parallel fluid transport tubes positioned within said rectangular shaped support structure which run the length of said rectangular shaped support structure;

each of said plurality of fluid transport tubes having one end thereof connected to said fluid inlet passageway and an opposite end thereof connected to said fluid outlet passageway; and a radiating surface positioned adjacent said fluid transport tubes of said rectangular shaped support structure;

said radiating surface communicating with said fluid transport tubes to transfer heat provided by heated water flowing through said fluid transport tubes to said radiating surface without substantial heat loss.

2. The water heated panel of claim 1 wherein each of said plurality of fluid transport tubes is fabricated from copper.

3. The water heated panel of claim 1 further comprising a computer controlled fluid flow system coupled to said water heated panel for supplying said heated water to said water heated panel.

4. The water heated panel of claim 3 wherein said computer controlled fluid flow system comprises:

a pump having an inlet port connected to a reservoir of water at ambient temperature and a discharge port;

a water heater having an inlet port connected to the discharge port of said pump and an outlet port;

a first electrically activated fluid control valve having an inlet port connected to the outlet port of said water heater and an outlet port connected to the fluid inlet passageway of said water heated panel;

a second electrically activated fluid control valve having an inlet port connected to the discharge port of said pump and an outlet port connected to the fluid inlet passageway of said water heated panel;

each of said first and second electrically activated fluid control valves having an electrical control mechanism;

a computer connected to the electrical control mechanism of said first and second electrically activated fluid control valves, said computer selectively opening and closing said first and second electrically activated fluid control valves to maintain the heated water supplied to said water heated panel at a predetermined temperature.

5. The water heated panel of claim 4 further comprising first, second, third and fourth thermocouples mounted on a backside of said water heated panel to monitor water temperature of said heated water flowing through the fluid transport tubes of said water heated panel, each of said first, second, third and fourth thermocouples being connected to said computer.

6. The water heated panel of claim 4 further comprising an optical pyrometer positioned downstream from the radiating surface of said water heated panel, said optical pyrometer monitoring the infrared signature from the radiating surface of said water heated panel, said optical pyrometer being connected to said computer.

7. The water heated panel of claim 4 wherein said predetermined temperature is within a range of 15 to 50 degrees Fahrenheit above said ambient temperature.

8. A water heated panel for simulating an infrared signature of a heat generating structure on a target vessel, said water heated panel comprising:

a generally rectangular shaped support structure;

a fluid inlet passageway positioned at a top portion of said rectangular shaped support structure;

a fluid outlet passageway positioned at a bottom portion of said rectangular shaped support structure;

a plurality of equally spaced substantially parallel fluid transport tubes positioned within said rectangular shaped support structure which run the length of said rectangular shaped support structure;

each of said plurality of fluid transport tubes having one end thereof connected to said fluid inlet passageway and an opposite end thereof connected to said fluid outlet passageway;

a radiating surface positioned adjacent said fluid transport tubes of said rectangular shaped support structure;

said radiating surface communicating with said fluid transport tubes to transfer heat provided by heated water flowing through said fluid transport tubes to said radiating surface without substantial heat loss;

a computer controlled fluid flow system coupled to said water heated panel for supplying said heated water to said water heated panel;

said computer controlled fluid flow system including:

a seawater pump having an inlet port connected to a reservoir of water at ambient temperature and a discharge port;

a water heater having an inlet port connected to the discharge port of said seawater pump and an outlet port;

a first electrically activated fluid control valve having an inlet port connected to the outlet port of said water heater and an outlet port connected to the fluid inlet passageway of said water heated panel;

a second electrically activated fluid control valve having an inlet port connected to the discharge port of said seawater pump and an outlet port connected to the fluid inlet passageway of said water heated panel;

each of said first and second electrically activated fluid control valves having an electrical control mechanism;

a computer connected to the electrical control mechanism of said first and second electrically activated fluid control valves, said computer selectively opening and closing said first and second electrically activated fluid control valves to maintain the heated water supplied to said water heated panel at a predetermined temperature.

9. The water heated panel of claim 8 further comprising first, second, third and fourth thermocouples mounted on a backside of said water heated panel to monitor water temperature of said heated water flowing through the fluid transport tubes of said water heated panel, each of said first, second, third and fourth thermocouples being connected to said computer.

10. The water heated panel of claim 8 further comprising an optical pyrometer positioned downstream from the radiating surface of said water heated panel, said optical pyrometer monitoring the infrared signature from the radiating surface of said water heated panel, said optical pyrometer being connected to said computer.

11. The water heated panel of claim 8 wherein said predetermined temperature is within a range of 15 to 50 degrees Fahrenheit above said ambient temperature.

12. The water heated panel of claim 8 wherein each of said plurality of fluid transport tubes is fabricated from copper.

13. A water heated panel for simulating an infrared signature of a heat generating structure on a target vessel, said water heated panel comprising:

a generally rectangular shaped support structure;

a fluid inlet passageway positioned at a top portion of said rectangular shaped support structure;

a fluid outlet passageway positioned at a bottom portion of said rectangular shaped support structure;

a plurality of equally spaced substantially parallel fluid transport tubes positioned within said rectangular shaped support structure which run the length of said rectangular shaped support structure;

each of said plurality of fluid transport tubes having one end thereof connected to said fluid inlet passageway and an opposite end thereof connected to said fluid outlet passageway;

a radiating surface positioned adjacent said fluid transport tubes of said rectangular shaped support structure;

said radiating surface communicating with said fluid transport tubes to transfer heat provided by heated water flowing through said fluid transport tubes to said radiating surface without substantial heat loss;

a computer controlled fluid flow system coupled to said water heated panel for supplying said heated water to said water heated panel; said computer controlled fluid flow system including:

a seawater pump having an inlet port connected to a reservoir of water at ambient temperature and a discharge port;

a water heater having an inlet port connected to the discharge port of said seawater pump and an outlet port;

a first electrically activated fluid control valve having an inlet port connected to the outlet port of said water heater and an outlet port connected to the fluid inlet passageway of said water heated panel;

a second electrically activated fluid control valve having an inlet port connected to the discharge port of said seawater pump and an outlet port connected to the fluid inlet passageway of said water heated panel;

each of said first and second electrically activated fluid control valves having an electrical control mechanism;

a computer connected to the electrical control mechanism of said first and second electrically activated fluid control valves;

a plurality of thermocouples mounted on a backside of said water heated panel to monitor water temperature of said heated water flowing through the fluid transport tubes of said water heated panel, said plurality of thermocouples being connected to said computer to provide electrical signals indicative of said water temperature to said computer;

said computer, responsive to the electrical signals provided by said plurality of theremocouples, selectively opening and closing said first and second electrically activated fluid control valves to maintain the heated water supplied to said water heated panel at a predetermined temperature.

14. The water heated panel of claim 13 wherein said plurality of thermocouples comprise first, second, third and fourth thermocouples mounted on said backside of said water heated panel.

15. The water heated panel of claim 13 further comprising an optical pyrometer positioned downstream from the radiating surface of said water heated panel, said optical pyrometer monitoring the infrared signature from the radiating surface of said water heated panel, said optical pyrometer being connected to said computer.

16. The water heated panel of claim 13 wherein said predetermined temperature is within a range of 15 to 50 degrees Fahrenheit above said ambient temperature.

17. The water heated panel of claim 13 wherein each of said plurality of fluid transport tubes is fabricated from copper.

* * * * *